May 5, 1936.  R. J. SMITH  2,039,460

MOTORBUS CONSTRUCTION

Filed May 10, 1932  2 Sheets-Sheet 1

Inventor;
Robert J. Smith
Dohm & Taylor
Attorneys.

May 5, 1936. R. J. SMITH 2,039,460
MOTORBUS CONSTRUCTION
Filed May 10, 1932 2 Sheets-Sheet 2
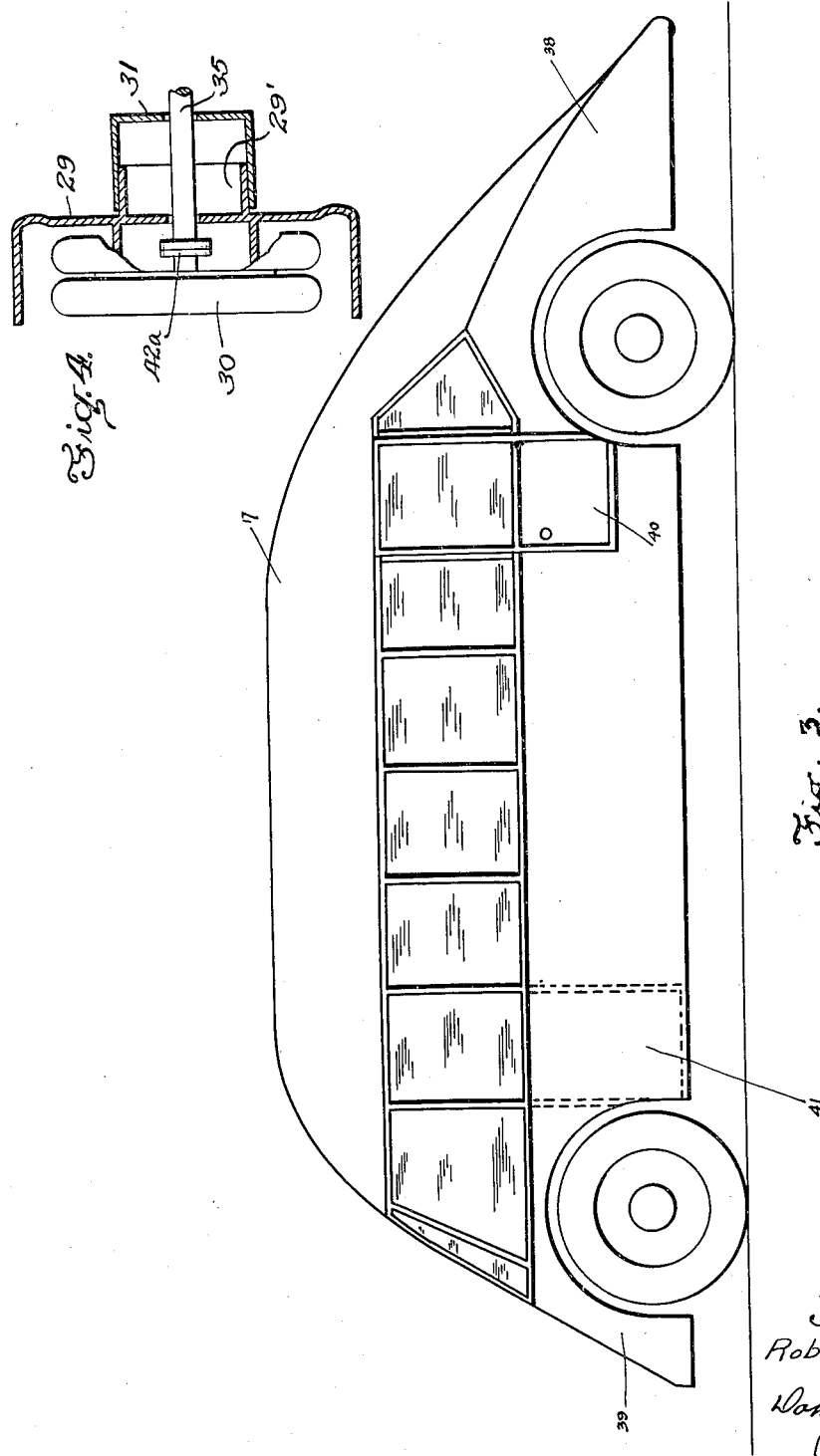
Inventor;
Robert J. Smith
Dohu + Taylor
Attorneys.

Patented May 5, 1936

2,039,460

UNITED STATES PATENT OFFICE 2,039,460

MOTORBUS CONSTRUCTION

Robert J. Smith, Baltimore, Md.

Application May 10, 1932, Serial No. 610,411

5 Claims. (Cl. 180—1)

This invention relates to a motor bus, and more particularly to the arrangement of chassis and power elements, in which the motive power is located at the rear of the bus and comprises twin motors operating to drive the rear wheels, each motor driving a wheel or wheels to one side of the bus.

It has for an object the provision of a motor bus having a low center of gravity.

A further object is the location of the motive power at the rear of the bus.

Still further objects of the invention are (1) to avoid the usual transmission comprising a differential, and to improve the riding qualities of motor buses by avoiding shocks due to rough roads, (2) the elimination of weight in bus construction, and (3) to provide a motor bus which reduces the wind resistance to a minimum.

Other objects and advantages of the invention will hereinafter appear in the following description, and the novel features thereof will be particularly pointed out in the appended claims.

Figure 1:
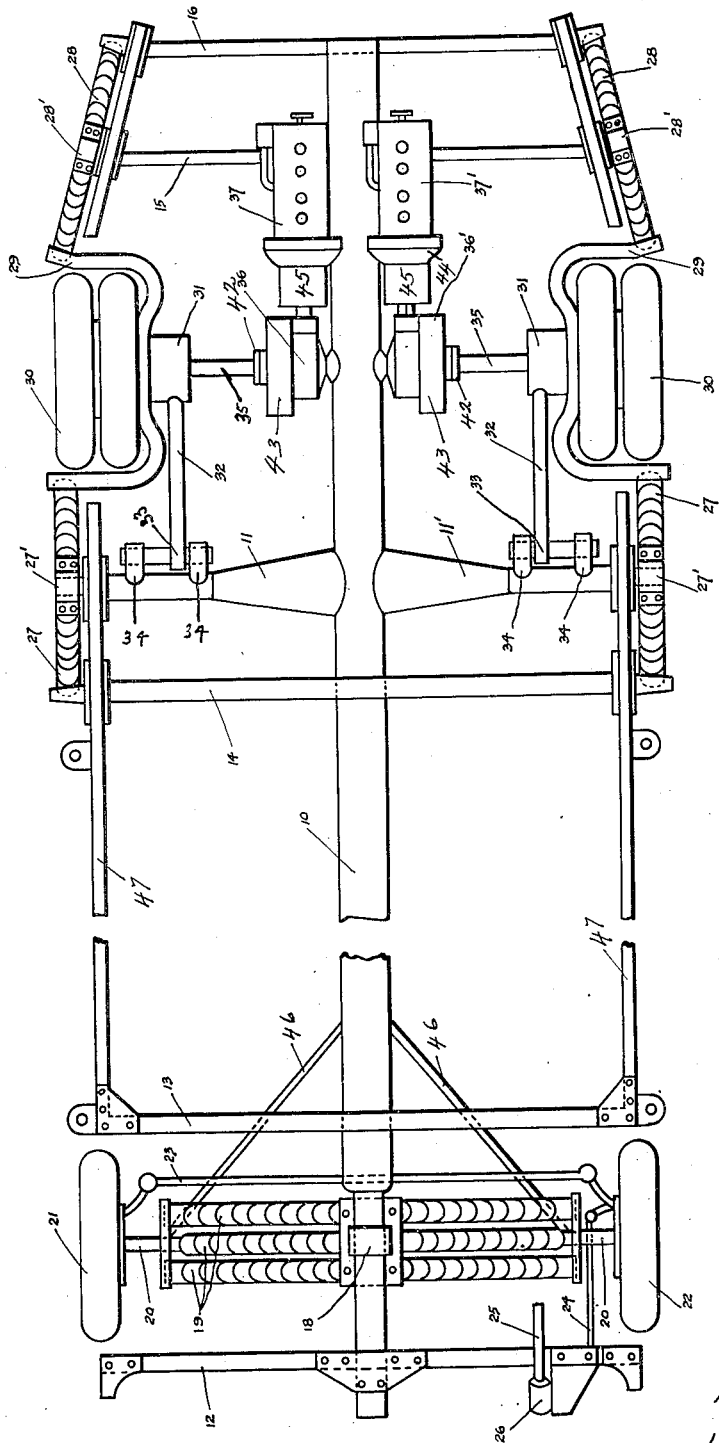
Figure 2:
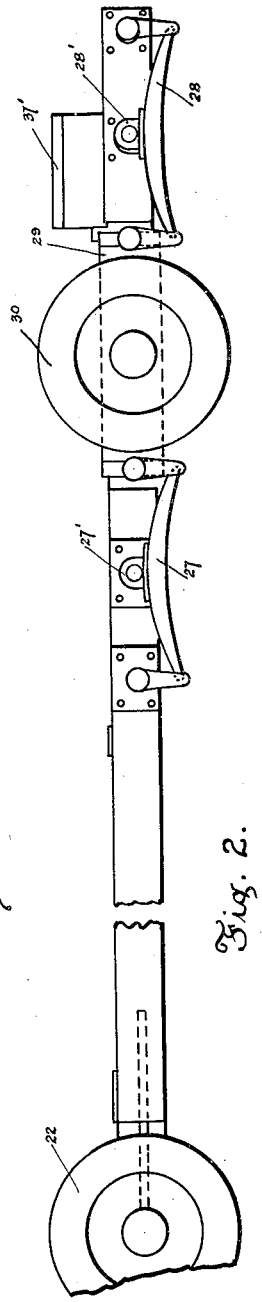

In the drawings, like reference numerals indicate like parts throughout the several figures, in which Fig. 1 is a plan view of the chassis of a motor bus embodying the invention, Fig. 2 is a side elevation of such a chassis, Fig. 3 is a side elevation of the completed motor bus to be mounted on the chassis of Figs. 1 and 2, in which the lines are selected to eliminate wind resistance, and Fig. 4 is a horizontal section through a wheel frame 29 and casing 31, a part of the wheel structure being broken away to show the universal joint 42a on axle 35.

The motor bus of this application may be said to comprise (1) a novel construction of chassis, (2) a motor drive embodying twin motors for driving the rear wheels, and (3) a body design selected for this particular chassis and motor drive, which at the same time offers a minimum of resistance to the wind. These three features will be described in their order in detail, after which their conjoint use in a single motor bus will be recited.

The numeral 10 is a central tubular member of a motor bus frame, from which tubular member extend lateral frame elements 11 and 11'. Out-riggers 12, 13, 14, 15 and 16 are attached to the longitudinal frame member 10 in any suitable manner as by welding, and these together with the frame members 47 and 48 suffice to support the usual body of the bus, indicated by 17 in Fig. 3.

At the forward end of the frame is mounted the bearing 18 for the front axle, which includes the three springs 19, and the axle 20, on the ends of which are mounted in the usual manner for swiveling the wheels 21 and 22. The tie rod 23 connects with the steering arm 24 and the steering column 25 through the worm 26. All of these steering parts are conventional in bus construction.

On each side of the motor bus are two springs 27 and 28 which support at their adjacent ends a wheel frame 29. The springs 27 and 28 are mounted on the frame centrally on bearings as at 27' and 28', and at their remote ends to the out-riggers 14 and 16 respectively.

The driving wheels 30 are mounted within the wheel frames 29. The casings 31 and frames 29 have relative oscillatory movement. As shown in Figure 4, the frame 29 has an annular flange 29' extending within the casing 31 and forming a bearing therewith permitting relative movement. This construction permits of an oscillating movement of the frame 29 in a vertical plane in response to the riding up of the wheel upon an obstruction in the road.

The wheels 30 and casings 31 may have vertical movement with the frame 29 but are held in vertical position by the torque arm 32 which is pivotally mounted at 33 is ears 34 projecting from the member 11 or 11'. The torque arm 32 also prevents sidewise play of the wheel 30.

A drive shaft 35 is connected to the driving axle by a universal joint within the casing 31, and also to the gear drives 36 and 36' by a similar universal joint 42.

The casings for the gear drives 36 and 36' are rigidly attached to the tubular member 10 as by welding in the same manner as the members 11 and 11'. Brake drums 43 may be used either for emergency braking or as service brakes. If these drums are used for emergency brakes then suitable service brakes are arranged in the rear and front wheels in the usual manner. In all cases the entire brake mechanism is controlled from the front of the car as is customary.

Power for the rear wheels is supplied from the twin engines 37 and 37' operating through the gear drives 36, 36' and the driving axles 35. As pointed out above the driving axles are provided with universal joints at both ends, one within the wheel hub and the other as shown at 42 adjacent the gear casing. The usual clutch mechanism for each engine is shown at 44 and the change speed transmission gearing for each engine is shown at 45. The control for the clutches is unitary and is operated from the front of the bus adjacent the drivers seat as is the usual custom and the transmission control for both engines is also unitary and controlled from the front of the car. It will be apparent that the driver will have at his command all of the necessary mechanism for controlling the starting and stopping of the engines, their acceleration and the control of the clutches and transmission gears as well as the brakes.

The frame of the machine is designed so as to be practically rigid and is so mounted with respect to the wheels as not to be subjected to any substantial strains. The tubular element 10 and the members 11, 11' constitute the principal elements for support of the frame structure indicated at 12, 13, 14, 15, 16, 47 and 48. The body of the bus rests upon the frame members 47 and 48. The member 10 is pivoted in the bearing 18 which is carried by the transverse springs 19 resting upon the axle 20. The springs 19 and axle 20 are maintained in position by means of the bearing 18 and the radius rods 46. It will be apparent that the front portion of the frame has practically a single point bearing at 18 and that vertical movement of the wheels 21 and 22 do not impose any twisting strain on the frame of the bus.

The springs 27 are mounted outside the frame and the springs 28 also mounted outside the frame structure are inclined inwardly at their rear ends, paralleling the frame structure at this point, which has the general effect of reducing any substantial side sway of the body of the vehicle. The general U-shape construction of the wheel frames 29 enables the driving wheels to be placed within the outline of the body and still gives a maximum breadth of wheel base due to the fact that the ends of the frames 29 are attached to the ends of springs 27 and 28 which are pivoted at 27' and 28'. The frame 29 is capable of a rocking movement in the plane of the wheels and produces an easy riding effect.

The two engines 37, 37' are located in the rear of the vehicle and closely adjacent to the driven wheels so that a very compact arrangement of the transmission mechanism between the engines and the wheels is obtained. Moreover by the use of two engines controlled by a single control means proper application of power to the driving wheels is obtained and the usual differential is eliminated. Also by this arrangement the usual gasolene line and other connections from the rear of the vehicle to the front where the engine is usually placed are eliminated. The fuel tank can be placed closely adjacent the engines in the rear of the vehicle and under the sloping end of the body. By locating the engines at the rear of the machine trouble from bad odors and the exhaust gases from the engines is eliminated. By this arrangement of the power plant in the vehicle all of the riding space in the bus is located in front of the rear wheels, giving the utmost in riding comfort. By reason of the arrangement of the rear springs and the rocking wheel frames 29 the riding qualities of the machine are substantially improved since the result is very similar to that obtained in a six wheel type of machine whereas only four wheels are actually used. By reason of the arrangement of the springs and the frame and the location of the engines in the place indicated a very low center of gravity of the vehicle may be obtained with a very broad wheel base which practically eliminates a reasonable possibility of overturning the machine in service.

Referring to Fig. 3 of the drawings the front end of the vehicle is shown at 39 on the left and the rear at 38.

40 indicates the emergency door and the main door is indicated at 41. These doors are located on opposite sides of the car as indicated by dotted lines at 41.

This feature also illustrates the stream line construction of the body of the vehicle to reduce wind resistance. It is known that substantially sixty-five percent of the wind resistance is in the rear end of the usual motor bus. By arranging the body as indicated in the drawings this resistance is substantially reduced and the smaller space at the rear of the body is employed for the power plant of the vehicle. This space in the design of the body shown could not be used for passenger space. Consequently no loss in passenger space results from the placing of the power plant in the rear end of the body. This gives more room for passengers at the front end so that with the same general type of bus as many passengers can be handled as is customary with the advantage that the power plant is arranged at the rear of the car and also with the further advantage that the stream line construction may be employed with increased efficiency in operation of the machine.

Having thus fully described my said invention, what I claim as new and desire to secure by Letters Patent is:

1. A motor bus frame comprising side members, cross members attached thereto and a central tubular member extending from end to end of the frame and attached to the cross members, a pair of transverse tubular members rigidly attached to the central tubular member, springs mounted centrally on the outer ends of said transverse tubular members and having one end of each spring secured to the ends of a cross member external of the side members of the frame, a pair of independently driven driving wheels, driving axles for said wheels, casings enclosing said axles, a U-shaped frame for each driving wheel pivoted on the casing thereof, a second set of springs at the rear of each driving wheel, said U-shaped frames being located between the two sets of springs and connected to their ends and a torque member connecting each casing to one of said transverse tubular members.

2. In a motor bus power plant, a frame having side members and cross members, a tubular member extending from end to end of the frame and located centrally thereof and having transverse tubular members extending beyond the side members of the frame, a pair of driving wheels located between the transverse tubular members and the rear end of the frame, each wheel having a U-shaped frame, a pair of springs mounted on the ends of the transverse tubular members and attached at one end to a cross piece of the frame and at the other end to the wheel frame, a pair of springs located in the rear of the wheels and attached to cross members of the frame and at one end to the wheel frames, the rear springs converging toward a center of the frame at their rear ends.

3. A motor bus construction comprising a frame having side members and cross members, a central longitudinal tubular member, transverse tubular members rigidly attached to the central member and extending beyond the side members of the frame, a pair of driving wheels mounted on universal axles located to the rear of the transverse tubular members each driving wheel having a frame spring connected to the vehicle frame and a wheel casing mounted thereon, and a torque member attached to the casing of each wheel and connected to its respective transverse tubular member.

4. In a motor bus construction, a frame structure comprising side members and cross members attached thereto, a central longitudinal tubular member extending from end to end of said frame, a pair of rear driving wheels, a pair of driving axles for said wheels each axle provided with a casing, an independent U-shaped wheel frame for each driving wheel pivoted on said casing and a pair of springs for each driving wheel located external to the side frame members and having one end of each spring in each pair attached to its respective wheel frame, and a torque member connecting each said casing to one of said cross members.

5. In a motor bus construction, a frame structure provided with rear driving wheels and axles, casings surrounding said axles adjacent the driving wheels, each such wheel having an independent U-shaped frame pivoted on its respective casing, each said U-shaped frame being attached to the vehicle frame by means of a spring mounting in front of and in the rear of a wheel, and a torque member mounted on each casing and connected to said vehicle frame structure.

ROBERT J. SMITH.